United States Patent
Gunther et al.

(10) Patent No.: US 8,949,635 B2
(45) Date of Patent: Feb. 3, 2015

(54) INTEGRATED CIRCUIT PERFORMANCE IMPROVEMENT ACROSS A RANGE OF OPERATING CONDITIONS AND PHYSICAL CONSTRAINTS

(75) Inventors: Stephen H. Gunther, Beaverton, OR (US); Stephan Jourdan, Portland, OR (US); Robert Greiner, Beaverton, OR (US); Edward A. Burton, Hillsboro, OR (US); Anant S. Deval, Beaverton, OR (US); Michael Cornaby, Hillsboro, OR (US); Jeremy Shrall, Portland, OR (US); Ray Ramadorai, Gaston, OR (US)

(73) Assignee: Intel Corporation, Santa Clara, CA (US)

( * ) Notice: Subject to any disclaimer, the term of this patent is extended or adjusted under 35 U.S.C. 154(b) by 1091 days.

(21) Appl. No.: 11/864,886

(22) Filed: Sep. 28, 2007

(65) Prior Publication Data

US 2009/0089543 A1    Apr. 2, 2009

(51) Int. Cl.
*G06F 1/32* (2006.01)
*G06F 9/38* (2006.01)
*G06F 9/30* (2006.01)

(52) U.S. Cl.
CPC .......... *G06F 9/3885* (2013.01); *G06F 9/30181* (2013.01); *G06F 9/3891* (2013.01)
USPC .......................................... 713/320; 713/300

(58) Field of Classification Search
CPC ........ G06F 1/32; G06F 1/3206; G06F 1/3296
USPC ................................. 713/300, 320
See application file for complete search history.

(56) References Cited

U.S. PATENT DOCUMENTS

| | | | |
|---|---|---|---|
| 5,502,838 A * | 3/1996 | Kikinis ................. | 713/501 |
| 6,711,691 B1 * | 3/2004 | Howard et al. ......... | 713/300 |
| 6,718,474 B1 * | 4/2004 | Somers et al. .......... | 713/322 |
| 6,766,460 B1 * | 7/2004 | Evoy et al. ............ | 713/323 |
| 6,804,632 B2 * | 10/2004 | Orenstien et al. ....... | 702/188 |
| 6,836,849 B2 * | 12/2004 | Brock et al. ........... | 713/310 |
| 6,901,522 B2 * | 5/2005 | Buch ................... | 713/320 |
| 6,908,227 B2 * | 6/2005 | Rusu et al. ............ | 374/141 |
| 7,069,189 B2 * | 6/2006 | Rotem .................. | 702/189 |
| 7,086,058 B2 * | 8/2006 | Luick .................. | 718/102 |
| 7,330,988 B2 * | 2/2008 | Golla et al. ........... | 713/322 |
| 7,349,762 B2 * | 3/2008 | Omizo et al. ........... | 700/278 |
| 7,389,438 B2 * | 6/2008 | Watts, Jr. .............. | 713/323 |
| 7,454,631 B1 * | 11/2008 | Laudon et al. .......... | 713/300 |
| 7,502,948 B2 * | 3/2009 | Rotem et al. ........... | 713/300 |
| 7,653,824 B2 * | 1/2010 | Rangarajan et al. ...... | 713/300 |
| 2005/0289365 A1 * | 12/2005 | Bhandarkar ............ | 713/300 |
| 2006/0136074 A1 * | 6/2006 | Arai et al. ............ | 700/2 |
| 2006/0149975 A1 * | 7/2006 | Rotem et al. ........... | 713/300 |
| 2009/0099705 A1 * | 4/2009 | Harris ................. | 700/300 |

* cited by examiner

*Primary Examiner* — Chun Cao
(74) *Attorney, Agent, or Firm* — Blakely, Sokoloff, Taylor & Zafman LLP

(57) ABSTRACT

Methods and apparatus to improve integrated circuit (IC) performance across a range of operating conditions and/or physical constraints are described. In one embodiment, an operating parameter of one or more of processor cores may be adjusted in response to a change in the activity level of processor cores (e.g., the number of active processor cores) and/or a comparison of one or more operating conditions and one or more corresponding threshold values. Other embodiments are also described.

13 Claims, 4 Drawing Sheets

INTEGRATED CIRCUIT PERFORMANCE IMPROVEMENT ACROSS A RANGE OF OPERATING CONDITIONS AND PHYSICAL CONSTRAINTS

BACKGROUND

The present disclosure generally relates to the field of electronics. More particularly, an embodiment of the invention relates to improving integrated circuit (IC) performance across a range of operating conditions and/or physical constraints.

Generally, an IC may be designed to operate within a specific environment. Such constraints may include physical parameters such as an allowable operating temperature range and an allowable operating voltage range. These parameters and specifications may be determined based on the worst case operating conditions. However, such configurations may provide a substantial difference between a typical operating point and the worst case operating point.

Moreover, when a product is tested in a high volume manufacturing environment, the operating parameters may be adjusted to ensure that an individual processor meets the relevant specifications, and that it may operate correctly and reliably within the described environment. In order to ensure that all relevant specifications are met, the operating frequency and voltage may be adjusted with fuses on a part-by-part basis. As a result of this set of specifications and constraints, the operating frequency for a specific processor may be permanently fused such that processor performance running a worst case workload in a worst case environment may be substantially lower than could be achieved when running a typical workload in a typical operating environment. Accordingly, achievable processor frequency may be left unused as a result of the worst case corner operating conditions. Furthermore, the delta between the fused frequency and achievable frequency is growing as multi-core processors become more common-place.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may provide techniques for improving IC performance across a range of operating conditions and/or physical constraints. In one embodiment, operating frequency and/or operating voltage may be adjusted based on workload and/or operating conditions, such that performance is improved (e.g., maximized) across various operating conditions. In some embodiments, the operating frequency and/or operating voltage are increased until one or more of the operating condition limits are reached. Moreover, frequency may be increased when there is some indication that the operating system is able to utilize the additional performance made available by the processor.

Figure 1:
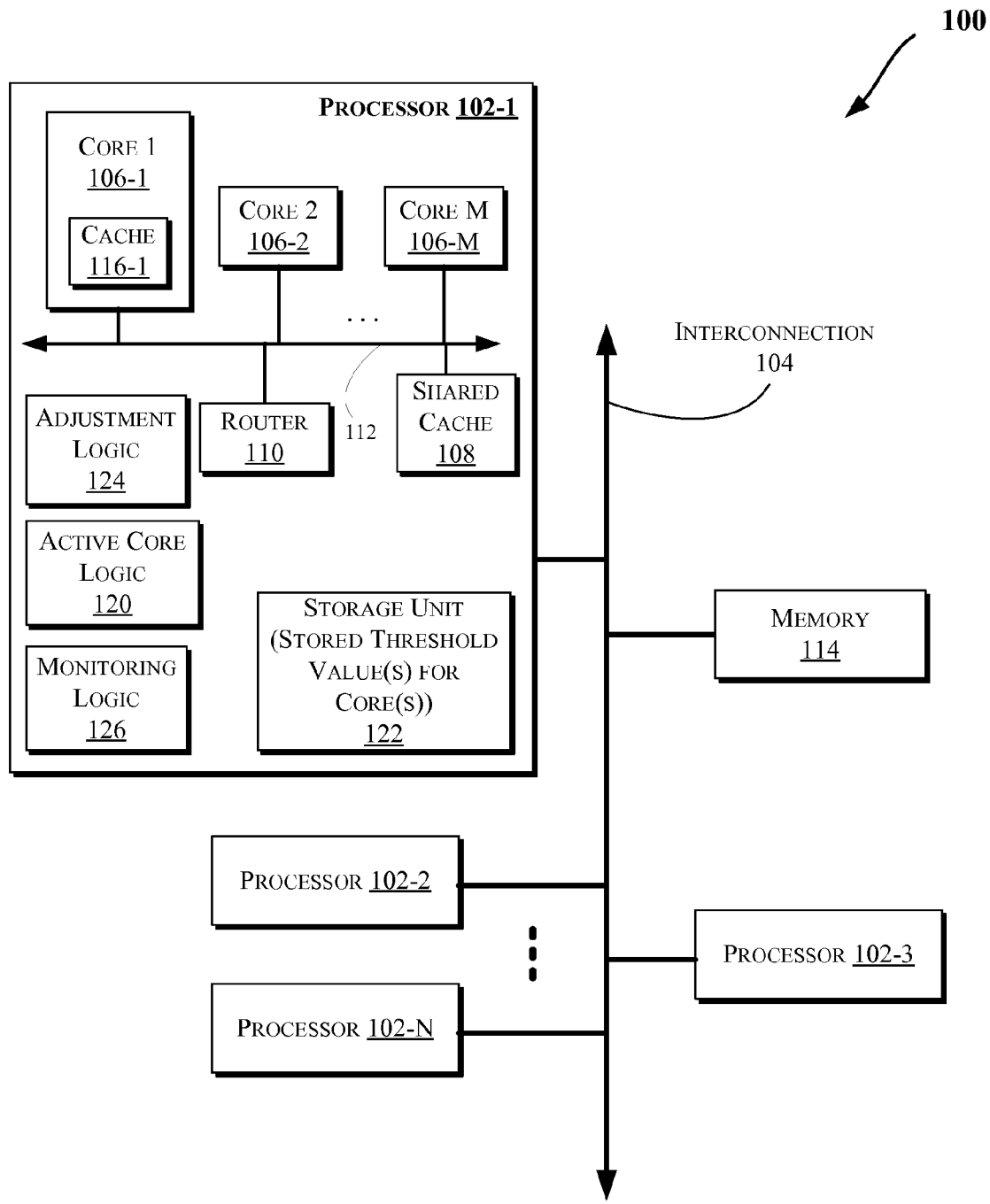
FIGS. 1, 3, and 4 illustrate block diagrams of computing systems in accordance with various embodiments of the invention.

Additionally, some embodiments may be provided in various environments, such as those discussed with reference to FIGS. 1-4. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108 and/or cache 116-1), buses or interconnections (such as a bus or interconnection network 112), memory controllers (such as those discussed with reference to FIGS. 3 and 4), or other components.

In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a cache (116-1) such as a level 1 (L1) cache (generally referred to herein as "cache 116").

As shown in FIG. 1, the processor 102-1 may also include an active core logic 120 (e.g., to monitor the operational status of cores 106 and/or determine the level of activity (for example, the number of the cores 106 or their execution unit(s) that are in an active state, for example, processing data and/or instruction(s)) or the operating frequency or voltage of the cores) and a storage unit 122 (e.g., to store threshold value(s) for cores 106). As discussed further herein, the stored threshold values 122 may be utilized by an adjustment logic 124 (e.g., in conjunction with information from a monitoring logic 126) to increase and/or decrease operating frequency and/or voltage of one or more of the cores 106 in accordance with some embodiments. Moreover, even though logic 120, logic 124, logic 126, and storage unit 122 are shown to be included within the processor 102-1, one or more of the items 120-126 may be located elsewhere in the system 100 (e.g., within other processors 102, other components of system 100, etc.).

Figure 2:
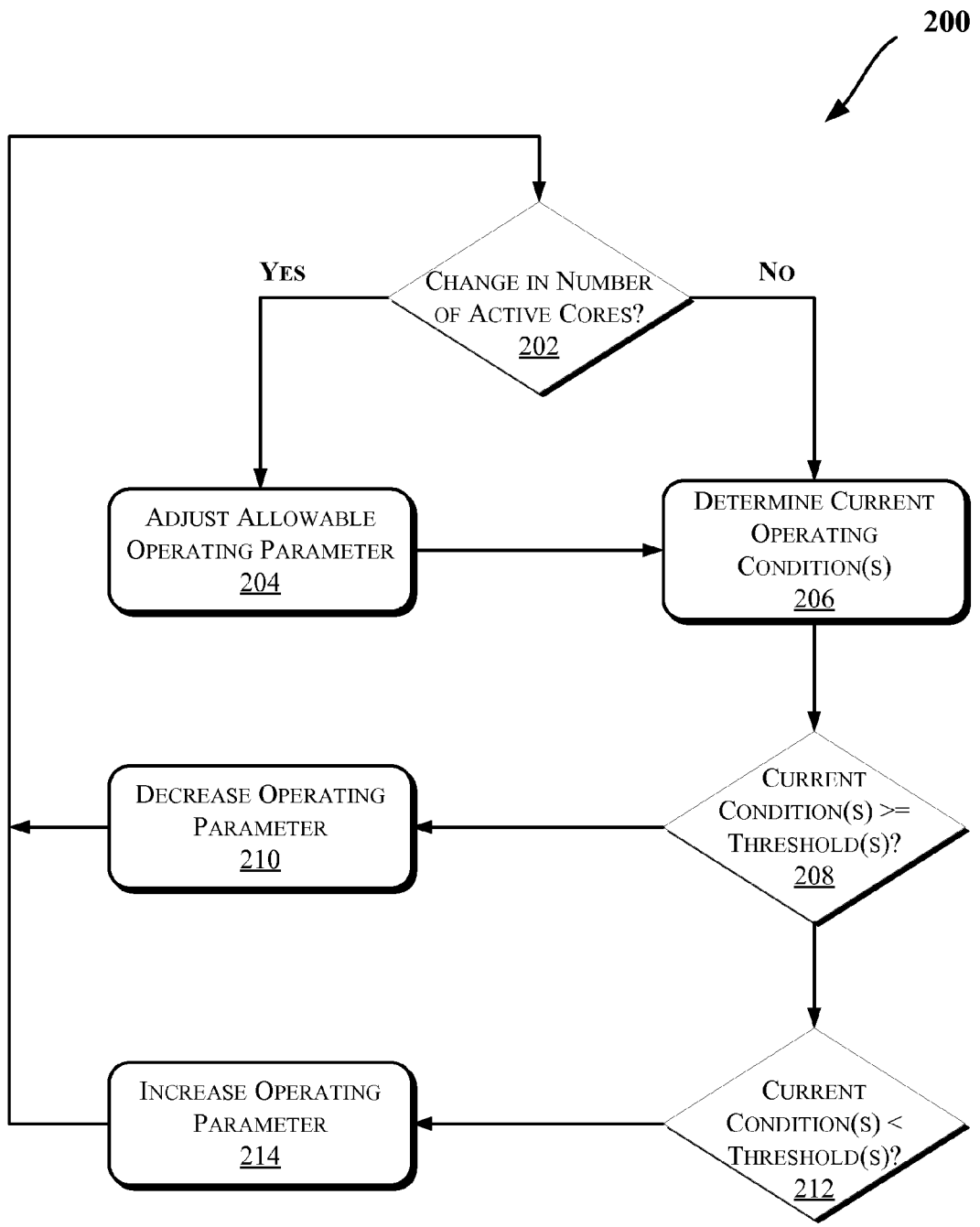
FIG. 2 illustrates a flow diagram of a method, according to an embodiment.

FIG. 2 illustrates a flow diagram of a method 200 to adjust performance of a multiple-core processor, according to an embodiment. In one embodiment, various components discussed with reference to FIGS. 1, 3, and 4 may be utilized to perform one or more of the operations discussed with reference to FIG. 2. For example, the method 200 may be used to adjust the performance of the processors 102 of FIG. 1 and/or processors discussed with reference to FIG. 3 or 4.

Referring to FIGS. 1-2, at an operation 202, it may be determined whether a change in number of active cores has occurred (e.g., active core logic 120 may determine whether a change in the number of cores 106 that are active has occurred). In some embodiments, the operation 202 may determine whether there is a change in the level of activity of cores (e.g., by considering core operating frequency or voltage, the number of execution units enabled, etc.). If a change has occurred, at an operation 204, the allowable operating parameter, including for example operating frequency and/or operating voltage (e.g., as determined by reference to the storage unit 122), for one or more cores 106 may be adjusted. For example, adjustment logic 124 may cause the operating frequency and/or voltage of one or more of the cores 106 to be adjusted (e.g., by the logic 124).

If no change has occurred at operation 202 (or after operation 204), the operating condition of the corresponding processor may be determined at an operation 206. In an embodiment, the current operating condition or behavior (e.g., current power usage, operating current (Icc), temperature, operating voltage, etc.) is monitored by a logic 126, e.g., provided in a corresponding processor (such as processor 102-1 shown in FIG. 1 or within a system such as system 100 of FIG. 1). In some embodiments, the logic 120 may be provided within logic 126. Moreover, the monitoring logic 126 may be coupled to one or more sensors (not shown) that correspond to the processor component(s) or core(s) being monitored to determine the operating conditions discussed herein (e.g., current power usage, operating current (Icc), temperature, operating voltage, etc.).

At operations 208 and 212, the condition(s) determined at operation 206 may be compared against operating condition constraint(s)/threshold(s) (e.g., the adjustment logic 124 may compare the condition(s) determined by the monitoring logic 126 with values stored in the storage unit 122 at operation 208). Based on the comparisons, the operating parameters may be adjusted dynamically, for example, an operating parameter may be adjusted upward (at operation 214) when the current behavior is below all or most (or at least some) of the limit(s)/threshold(s) and downward (at operation 210) when the current behavior is at or above one or more of the limit(s)/threshold(s).

Further, in some embodiments, thermal design power (TDP), maximum operating current (Icc_max), and/or thermal design current (Icc_TDC) may be monitored (e.g., by logic 126), in addition to temperature, maximum operating voltage (Vmax), and/or maximum frequency. Because some constraints may not be dynamically monitored fast enough to change behavior in time to avoid or reduce violating specifications, Icc_max, Vmax, and/or maximum frequency may be limited by "fusing" different operating limits (e.g., or implemented as stored values in unit 122) based on the number of active processor cores (as determined by the logic 120), for example. In an embodiment, the maximum frequency may be different when a single processor core is active than when multiple processor cores are active. By monitoring such constraints, an embodiment may improve performance across various workloads.

Moreover, in order to ensure that other physical constraints on a processor are not exceeded, two or more operating parameter values may be fused (or stored as a value in storage unit 122) in one embodiment: one or more for the condition when multiple processor cores are active, and the other for the condition when only one of the processor cores is active. This approach may allow a multi-core processor to increase frequency when only one core is active, but it is not able to take advantage of other variations in workload. For example, in an embodiment, all single core workloads may be run at one fused or stored frequency, independent of the power consumed or operating temperature, and all multi-core workloads may be run at another frequency, independent of power consumption or other physical constraints. Accordingly, the frequency achievable may be dynamically adjusted by the monitored constraints. Further, performance may be increased on low-power workloads, without requiring an increase in system capabilities (e.g., thermal or power delivery). As processors add more cores, such embodiments allow for scaling of single-thread performance, while achieving the benefits of multiple cores on workloads that are able to utilize them. Additionally, the techniques discussed herein may be applied to any type of a multiple-core processor, such as graphics processors, network processors, etc.

Figure 3:
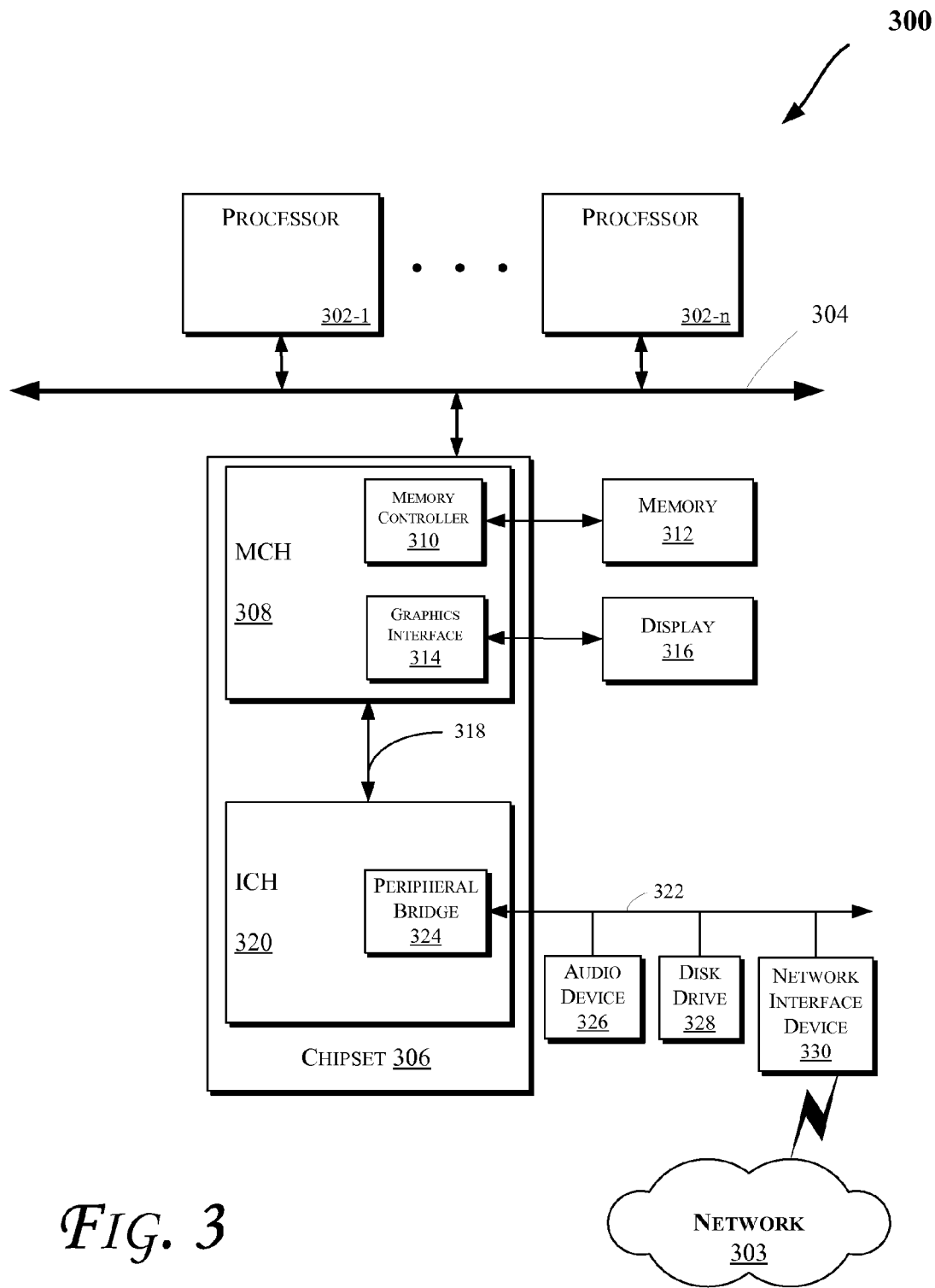

FIG. 3 illustrates a block diagram of a computing system 300 in accordance with an embodiment of the invention. The computing system 300 may include one or more central processing unit(s) (CPUs) 302 or processors that communicate via an interconnection network (or bus) 304. The processors 302 may include a general purpose processor, a network processor (that processes data communicated over a computer network 303), or other types of a processor (including a reduced instruction set computer (RISC) processor or a complex instruction set computer (CISC)). Moreover, the processors 302 may have a single or multiple core design. The processors 302 with a multiple core design may integrate different types of processor cores on the same IC die. Also, the processors 302 with a multiple core design may be implemented as symmetrical or asymmetrical multiprocessors. In an embodiment, the operations discussed with reference to FIGS. 1-2 may be performed by one or more components of the system 300.

A chipset 306 may also communicate with the interconnection network 304. The chipset 306 may include a memory control hub (MCH) 308. The MCH 308 may include a memory controller 310 that communicates with a memory 312. The memory 312 may store data, including sequences of instructions, that are executed by the CPU 302, or any other device included in the computing system 300. In one embodiment of the invention, the memory 312 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 304, such as multiple CPUs and/or multiple system memories.

The MCH 308 may also include a graphics interface 314 that communicates with a display device 316. In one embodiment of the invention, the graphics interface 314 may communicate with the display device 316 via an accelerated graphics port (AGP). In an embodiment of the invention, the display 316 (such as a flat panel display) may communicate with the graphics interface 314 through, for example, a signal converter that translates a digital representation of an image stored in a storage device such as video memory or system memory into display signals that are interpreted and displayed by the display 316. The display signals produced by the display device may pass through various control devices before being interpreted by and subsequently displayed on the display 316.

A hub interface 318 may allow the MCH 308 and an input/output control hub (ICH) 320 to communicate. The ICH 320 may provide an interface to I/O device(s) that communicate with the computing system 300. The ICH 320 may communicate with a bus 322 through a peripheral bridge (or controller) 324, such as a peripheral component interconnect (PCI) bridge, a universal serial bus (USB) controller, or other types of peripheral bridges or controllers. The bridge 324 may provide a data path between the CPU 302 and peripheral devices. Other types of topologies may be utilized. Also, multiple buses may communicate with the ICH 320, e.g., through multiple bridges or controllers. Moreover, other peripherals in communication with the ICH 320 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 322 may communicate with an audio device 326 (e.g., to communicate and/or process audio signals), one or more disk drive(s) 328, and a network interface device 330 (which is in communication with the computer network 303). Other devices may communicate via the bus 322. Also, various components (such as the network interface device 330) may communicate with the MCH 308 via a high speed (e.g., general purpose) I/O bus channel in some embodiments of the invention. In addition, the processor 302 and the MCH 308 may be combined to form a single chip. Furthermore, a graphics accelerator may be included within the MCH 308 in other embodiments of the invention.

Furthermore, the computing system 300 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 4:
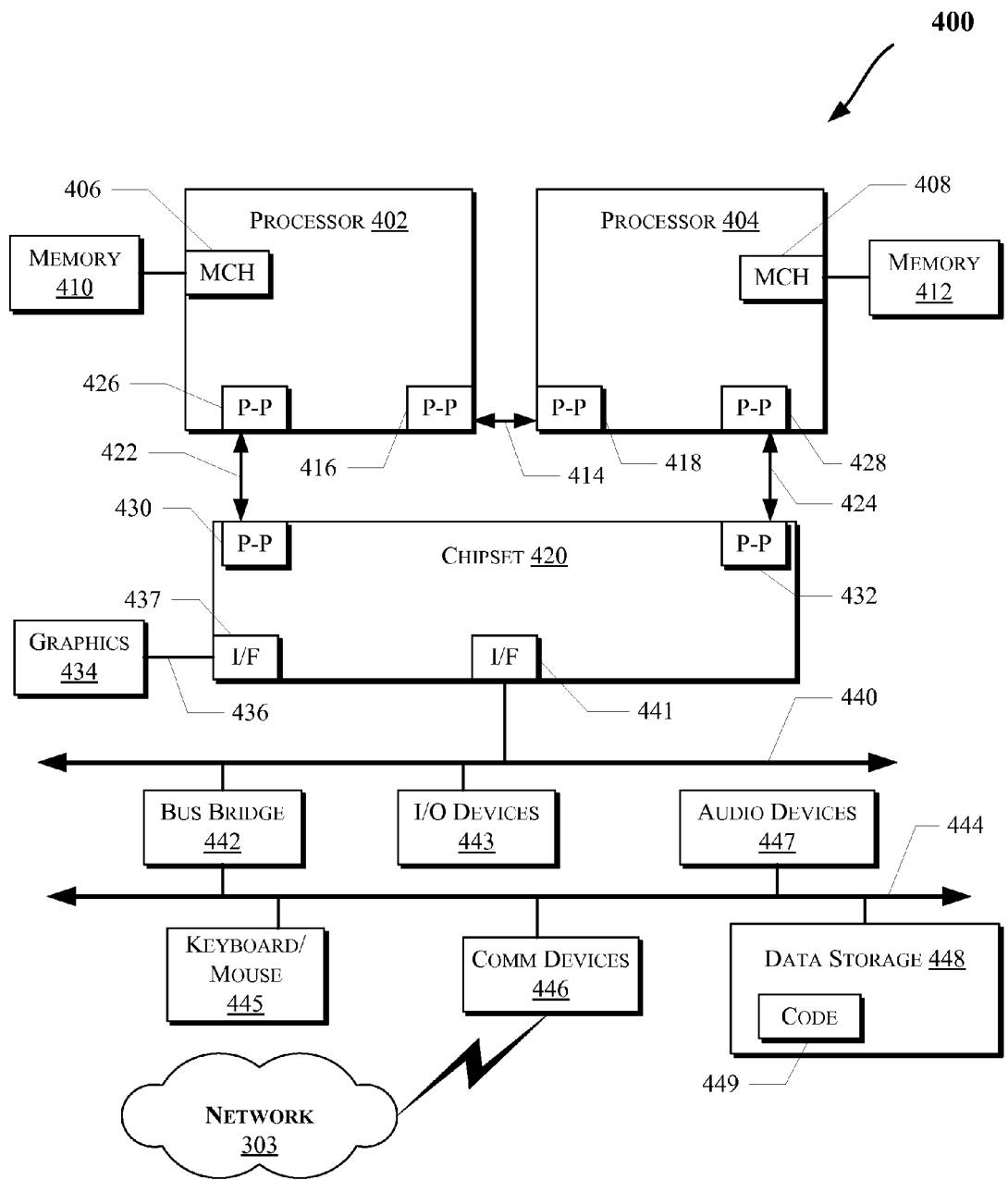

FIG. 4 illustrates a computing system 400 that is arranged in a point-to-point (PtP) configuration, according to an embodiment of the invention. In particular, FIG. 4 shows a system where processors, memory, and input/output devices are interconnected by a number of point-to-point interfaces. The operations discussed with reference to FIGS. 1-3 may be performed by one or more components of the system 400.

As illustrated in FIG. 4, the system 400 may include several processors, of which only two, processors 402 and 404 are shown for clarity. The processors 402 and 404 may each include a local memory controller (MC) 406 and 408 to enable communication with memories 410 and 412. The memories 410 and/or 412 may store various data such as those discussed with reference to the memory 312 of FIG. 3.

In an embodiment, the processors 402 and 404 may be one of the processors 302 discussed with reference to FIG. 3. The processors 402 and 404 may exchange data via a point-to-point (PtP) interface 414 using PtP interface circuits 416 and 418, respectively. Further, the processors 402 and 404 may include a high speed (e.g., general purpose) I/O bus channel in some embodiments of the invention to facilitate communication with various components (such as I/O device(s)). Also, the processors 402 and 404 may each exchange data with a chipset 420 via individual PtP interfaces 422 and 424 using point-to-point interface circuits 426, 428, 430, and 432. The chipset 420 may further exchange data with a graphics circuit 434 via a graphics interface 436, e.g., using a PtP interface circuit 437.

At least one embodiment of the invention may be provided within the processors 402 and/or 404. For example, one or more of the components discussed with reference to FIGS. 1-2 may be provided in the processors 402 and/or 404. Other embodiments of the invention, however, may exist in other circuits, logic units, or devices within the system 400 of FIG. 4. Furthermore, other embodiments of the invention may be distributed throughout several circuits, logic units, or devices illustrated in FIG. 4.

The chipset 420 may communicate with a bus 440 using a PtP interface circuit 441. The bus 440 may communicate with one or more devices, such as a bus bridge 442 and I/O devices 443. Via a bus 444, the bus bridge 442 may communicate with other devices such as a keyboard/mouse 445, communication devices 446 (such as modems, network interface devices, or other communication devices that may communicate with the computer network 303), audio I/O device 447, and/or a data storage device 448. The data storage device 448 may store code 449 that may be executed by the processors 402 and/or 404.

In various embodiments of the invention, the operations discussed herein, e.g., with reference to FIGS. 1-4, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-4.

Additionally, such computer-readable media may be downloaded as a computer program product, wherein the program may be transferred from a remote computer (e.g., a server) to a requesting computer (e.g., a client) by way of data signals embodied in a propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A processor comprising:
a plurality of processor cores;
active core logic to determine a change in a number of the plurality of processor cores that are in an active state;
monitoring logic to
determine operating conditions of the active processor cores, wherein the operating conditions include current power usage, maximum operating current, thermal design power, thermal design current, and maximum operating voltage, and
compare the determined operating conditions of the processor cores to a threshold value; and
adjustment logic to adjust an operating parameter of the processor cores in response to the comparison of the operating condition to the threshold value, wherein the adjustment logic is to increase a value of the operating parameter in response to the operating condition indicating a value that is lower than the threshold value and to decrease a value of the operating parameter in response to the operating condition indicating a value that is higher than or equal to the threshold value, wherein an operating condition for when multiple processor cores of the plurality of cores are to be active and an operating condition for only a single processor core of the plurality of cores is to be active are fused to comprise the threshold value and wherein all single core workloads are fused at a single frequency that is independent of power consumed or operating temperature.

2. The processor of claim 1, wherein the operating parameter comprises one or more of: (a) an operating frequency of one or more of the plurality of processor cores; or (b) an operating voltage of one or more of the plurality of processor cores.

3. The processor of claim 1, further comprising one or more sensors to detect the operating condition.

4. The processor of claim 1, wherein the operating condition correspond to one or more of the plurality of processor cores.

5. The processor of claim 1, wherein one or more of the plurality of processor cores and one or more of the first logic, or the second logic are on a same integrated circuit die.

6. A method comprising:
determining that there is no change in a number of active processor cores;
determining current operating conditions of the active processor cores, wherein the operating conditions include current power usage, maximum operating current, thermal design power, thermal design current, and maximum operating voltage;
comparing the determined current operating condition of the active processor cores to a stored threshold value;
adjusting the operating parameter by increasing a value of the operating parameter in response to the one or more operating conditions indicating a value that is lower than the threshold value and decreasing a value of the operating parameter in response to the one or more operating conditions indicating a value that is higher than or equal to the threshold value;
wherein an operating condition for when multiple processor cores of the plurality of cores are to be active and an operating condition for only a single processor core of the plurality of cores is to be active are fused to comprise the threshold value and wherein all single core workloads are fused at a single frequency that is independent of power consumed or operating temperature.

7. The method of claim 6, further comprising storing the threshold value in a storage unit of the processor.

8. A computing system comprising:
a memory to store one or more threshold values; and
a processor having a plurality of processor cores, the processor comprising:
active core logic to determine a change in a number of the plurality of processor cores that are in an active state;
monitoring logic to
determine one or more operating conditions within the active processor cores, wherein the operating condition is selected from one or more of: current power usage, operating current, and operating voltage, and
compare the one or more determined operating conditions to a stored threshold value; and
adjustment logic to dynamically adjust an operating parameter of one or more of the plurality of processor cores in response to comparing the one or more operating conditions to the stored threshold value, wherein the adjustment logic is to increase a value of the operating parameter in response to the operating condition indicating a value that is lower than the threshold value and to decrease a value of the operating parameter in response to the operating condition indicating a value that is higher than or equal to the threshold value, wherein an operating condition for when multiple processor cores of the plurality of cores are to be active and an operating condition for only a single processor core of the plurality of cores is to be active are fused to comprise the threshold value and wherein all single core workloads are fused at a single frequency that is independent of power consumed or operating temperature.

9. The system of claim 8, wherein the operating parameter comprises one or more of: (a) an operating frequency of one or more of the plurality of processor cores; or (b) an operating voltage of one or more of the plurality of processor cores.

10. The system of claim 8, further comprising one or more sensors to detect the one or more operating conditions.

11. The system of claim 8, further comprising an audio device coupled to the processor to communicate audio signals.

12. The processor of claim 1, wherein a processor core is in the active state while it is processing data or an instruction.

13. The processor of claim 1, wherein the monitoring logic to compare the operating condition of the processor cores to a second threshold.

* * * * *